United States Patent [19]

Kumm

[11] Patent Number: 4,854,921
[45] Date of Patent: Aug. 8, 1989

[54] VARIABLE SPEED ENGINE ACCESSORY FLAT BELT DRIVE SYSTEM

[75] Inventor: Emerson L. Kumm, Tempe, Ariz.

[73] Assignee: Kumm Industries, Inc., Phoenix, Ariz.

[21] Appl. No.: 248,174

[22] Filed: Sep. 23, 1988

[51] Int. Cl.⁴ ............................................. F16H 55/52
[52] U.S. Cl. ...................................... 474/70; 474/70; 474/138
[58] Field of Search .................................... 474/49–57, 474/69, 70, 101, 109, 111, 133, 135, 136, 138

[56] References Cited

U.S. PATENT DOCUMENTS

| | | | |
|---|---|---|---|
| 3,978,693 | 9/1976 | Worst | 474/138 X |
| 4,295,836 | 10/1981 | Kumm | 474/51 |
| 4,351,636 | 9/1982 | Hager | 474/138 X |
| 4,768,996 | 9/1988 | Kumm | 474/49 |

Primary Examiner—Thuy M. Bui
Attorney, Agent, or Firm—Cates & Phillips

[57] ABSTRACT

Variable speed operation for the accessories of a prime mover (such as an engine) is obtained by a flat belt coupling a variable diameter flat belt driving pulley to flat belt pulleys attached to each of the accessories. The variable diameter pulley assembly includes a shaft and a pair of pulley sheaves each having a pair of relatively movable guideway disks lying alongside each other. Inner and outer guideway disks of each pair include, respectively, first and second series of spiral guideways extending in opposite directions such that the guideway intersections locate bearing ends of a circumferential array of belt engaging elements extending between the pulley sheaves. Thus, mutual angular change between the guideway disks causes corresponding change in the effective diameter of the pulley assembly. In one embodiment, an integral speed responsive actuator assembly is incorporated into the pulley assembly and includes a housing with two pairs of variable volume fluid chambers and a pair of mirror image speed responsive valves which direct hydraulic fluid under pressure into one or the other of the chambers of each pair to obtain relative movement of a wall separating the chambers, which relative movement can be coupled to the guideway disk sets to change the effective diameter of the pulley assembly.

6 Claims, 4 Drawing Sheets

VARIABLE SPEED ENGINE ACCESSORY FLAT BELT DRIVE SYSTEM

FIELD OF THE INVENTION

This invention relates to the engine accessory drive art and, more particularly, to a variable speed engine accessory drive by which engine-driven accessories are prevented from over speeding as engine speed is increased.

BACKGROUND OF THE INVENTION

Internal combustion engines typically drive several accessories through a belt arrangement operating off the engine crankshaft. Eor example, an exemplary vehicle engine might drive such accessories as: an air pump, an alternator, a fan, an air conditioning compressor, a power steering pump and a water pump. A well recognized problem with such accessories as conventionally belt driven is that their rate of rotation is proportional to engine speed. Consequently, the designs of the accessories have been subject to substantial compromise in order to insure adequate performance at low engine speeds and dependability and reasonable longevity at high engine speeds. In recognition of these contradictory requirements, it has been proposed in the past that a variable speed accessory drive be employed which would serve to drive the accessories relatively faster at lower engine speeds and relatively slower at higher engine speeds.

If such an effective variable speed accessory drive can be realized, numerous benefits would be obtained. For example: the life of the accessory bearings would be greatly extended, power absorption at high speed would be greatly reduced such that more engine net power output would be available, fuel economy would be improved, better accessory performance at low engine speeds (such as idle) would be obtained, smaller accessories could be employed with resulting savings in initial cost and weight would be realized, etc.

In the variable speed accessory drives which have been proposed in the past, most have employed V-belt drives in which the driving and/or driven pulley is rendered variable in diameter by axially adjusting (under the influence of some speed responsive control system) the pulley sheave facing sections in order that the V-belt will ride at various depths in the variable diameter pulley. The fixed positions of the driving and driven pulley axes together with the fixed belt length results in the belt being tensioned and positioned radially in one of the driving or driven pulleys in an inverse fashion to the other of the driving or driven pulleys in a manner well known to the designers of such variable speed drives. The V-belts are composed of various compositions and have a trapezoidal cross section, the belt transmitting rotary motion at one speed from the engine to each accessory at another speed, the speed ratio being varied in a continuous or step-wise fashion from a minimum to a maximum as dependent on the geometry of the belt and the pulley system. It has been found that there are significant practical drawbacks to such an arrangement. The control and actuating systems are complex, expensive and do not enjoy longevity. The V-belt is compressed between smooth, conical sheave sections in the driving pulley by external axial forces acting on the sections to apply compression to the belt and friction between the sides of the belt in the sheave sections to prevent slippage In operation, a force unbalance caused by changes in the axial loading of the sheave sections causes the V-belt to change its radial positions in the driving pulley until a force balance is achieved or a limit range stop is reached.

For a large transmitted torque, the required axial forces exerted on the driving pulley sheave sections result in large compressive forces on the V-belt which requires that the belt have a substantial thickness to prevent its axial collapse or failure This increase in thickness increases the belt's centrifugal force and causes higher belt tension load. In addition, as the belt thickness increases, the pulley size must be increased due to higher stress loads at a given design minimum pulley radius. Further, the typical V-belt must continuously "pull out" from the compressive sheave load on leaving the variable diameter pulleys resulting in significant friction losses and belt fatigue which adversely affects the overall efficiency of the system and the operating life of the belt. Consequently, although variable speed pulley drives have successfully used V-belts in a wide range of applications, they have been severely limited in their power capabilities for more competitive smaller size equipment.

Thus, it is to a variable speed accessory drive which overcomes all these and other problems of the prior art systems to which my invention is directed

OBJECTS OF THE INVENTION

Consequently, it is a broad object of my invention to provide an improved engine accessory drive.

It is a more particular object of my invention to provide a variable speed engine accessory drive in which accessories are driven relatively raster at low engine speeds and relatively slower at higher engine speeds.

It is a still more specific object of my invention to provide such a variable speed engine accessory drive which employs a flat belt in conjunction with a variable diameter flat belt driving pulley coupled to the engine crankshaft.

It is a still yet more specific object of my invention to provide such a variable speed engine accessory drive in which the flat belt driving pulley assembly includes an integral speed responsive control actuator for effecting a change in diameter.

In a related aspect, it is another object of my invention to provide such a variable speed engine accessory drive in which the flat belt driven pulley assembly includes an integral speed responsive control actuator for effecting a change in diameter.

In another related aspect, it is another object of my invention to provide such a variable speed engine accessory drive in which both the flat belt driving and driven pulley assemblies each include an integral speed responsive control actuator for effecting a change in diameter.

SUMMARY OF THE INVENTION

Briefly, these and other objects of my invention are achieved by the use of a flat belt coupling a variable diameter flat belt driving pulley assembly to fixed (or variable) diameter flat belt pulleys attached to each of the several accessories using a force operated tensioner for belt length takeup. The driving variable diameter pulley assembly is connected to the engine crankshaft (typically to the vibration dampener) and includes a shaft and a pair of pulley sheaves each including a pair of relatively movable guideway disks lying alongside each other in juxtaposition. An inner guideway disk of each pair includes a first series of spiral guideways extending in one direction while an outer guideway disk of each pair includes a second series of spiral guideways extending in the opposite direction such that the guideway intersections capture and locate bearing ends of a circumferential array of belt engaging elements extending between the pulley sheaves. The inner guideway disks are locked together, and the outer guideway disks are locked together such that mutual angular change between the inner and outer guideway disks causes corresponding change in the radial positions of the belt engaging elements and hence the effective diameter of the pulley assembly. With one of the guideway disk sets coupled to the shaft, the action may be made responsive to the engine speed by providing a control mechanism for adjusting the angular relationship between the inner and outer guideway disk sets. In one preferred embodiment, an integral speed responsive actuator assembly is incorporated into the pulley assembly and includes a housing with at least a pair of variable volume fluid chambers and a speed responsive valve which directs hydraulic fluid under pressure into one or the other of the chambers to obtain relative movement of a wall separating the chambers If the wall is connected to the guideway disk set that is not connected to the shaft, angular movement between the guideway disk sets takes place to change the effective diameter of the pulley assembly. In one particularly preferred embodiment, two parallel stages having a total of four chambers and two valves are employed, and the valves are spool valves disposed for radial movement in opposite shaft struts and actuated by the centrifugal force of the spools acting against compression springs In variant configurations, the driving pulley may have a fixed diameter, and one or more of the driven pulleys may be variable diameter as described; or both the driving pulley and one or more of the driven pulleys may be variable diameter.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which.

DETAILED DESCRIPTION OF THE INVENTION

In the discussion of an exemplary embodiment of the invention which follows, emphasis is placed on a configuration in which only the driving pulley of a belt driven engine accessory system is variable diameter. It will be understood, however, that one or more of a system's driven pulleys can be rendered variable diameter by employing essentially the same structure (with minor modifications which will be noted below), and the driving pulley may or may not be variable in such a system.

Figure 1:
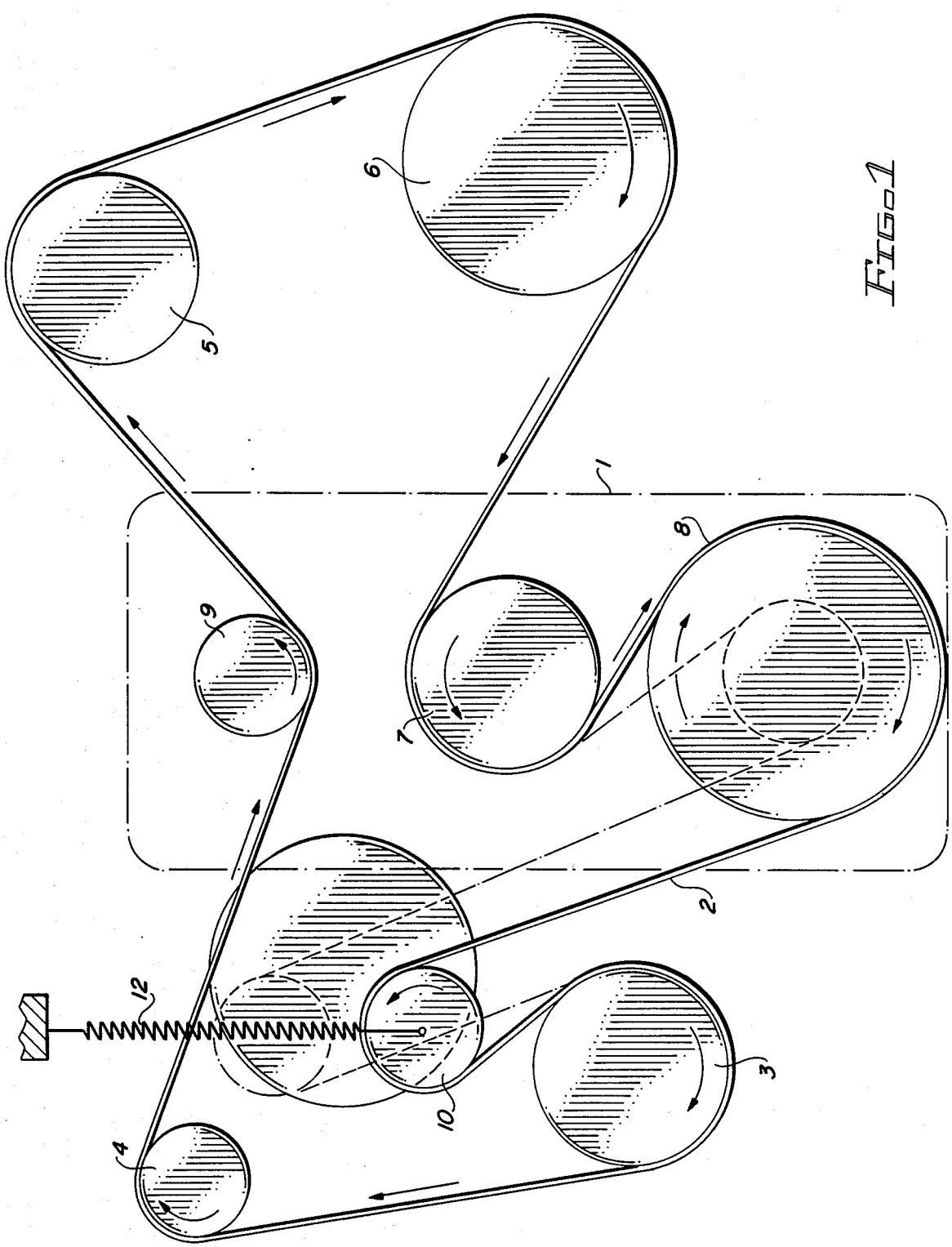
FIG. 1 is a generalized view representing an engine with an array of belt driven accessories.

Referring now to FIG. 1, a generalized view of an engine 1 having an array of accessories (represented by their respective flat belt pulleys) driven by a flat belt 2 is presented. The accessories, which are simply shown as exemplary as will be understood by those skilled in the art, include an air pump 3, an alternator 4, an air conditioning compressor 5, power steering pump 6, and a water pump 7 (which typically also carries a fan) all driven by a variable diameter pulley assembly 8 which is coupled to the engine crankshaft. A stationary idler 9 insures adequate wrap around the pulleys of the alternator 4 and the air conditioning compressor 5, and a spring loaded, moveable idler 10 maintains tension on the flat belt 2. More particularly, the moveable idler 10 is conventionally adapted, in conjunction with representative tension spring 12, to adjust its position with respect to the variable diameter pulley assembly 8 in order to maintain belt tension within an acceptable range when the effective diameter of the pulley assembly 8 changes Referring now to FIG. 2, fundamental aspects are presented of the flat belt, variable diameter pulley assembly which is the vital component of the subject system. The pulley assembly 11 includes a pair of pulley sheaves 16 and 17 between which there extends a series of belt engaging elements 18, the latter being engaged by a flat belt 13. In one construction, there is a series of twenty-four belt engaging elements 18 equally circumferentially distributed whereby an angle of fifteen degrees is established between runs of the belt 13 coming off tangentially from one belt engaging element 18 as compared to that of an immediately adjacent belt engaging element 18 Each belt engaging element 18 includes a central shank 28, which engages the belt 13, and bearing regions 29 at each end.

The pulley sheave 16 incorporates a pair of pulley guideway disks 19 and 21 which are parallel to and lie immediately adjacent each other in juxtaposition. Similarly the pulley sheave 17 incorporates a pair of pulley guideway disks 22 and 23 which are parallel to and lie immediately adjacent each other in juxtaposition. The longitudinal spacing between the pulley sheaves 16 and 17 (i.e., the axial spacing between the inner guideway disks 21 and 22) remains the same irrespective of the radial adjustment of the belt 13 for different accessory driving speeds. This spacing is sufficient to accommodate with clearance the belt engaging elements supporting the belt 13 which is selected to carry the load that the system is designed for as is well understood.

The range of radial adjustment or position of the belt 13 on the pulley assembly 11 is achieved by altering the radial positions of the belt engaging elements 18, and variations in the radial positions of the belt engaging elements 18 are obtained by relative rotation of the outer guideway disk 19 and the inner guideway disk 21 of pulley sheave 16 to change their angular relationship. Similarly, by identical relative rotation of the guideway disks 23, 22, respectively, of pulley sheave 17, change of angular relationship is accomplished. As a practical matter, to insure synchronous operation, the inner guideway disks 21 and 22 are physically locked together, and the outer guideway disks 19 and 23 are also locked together.

The outer guideway disk 19 has a series of logarithmic spiral guideways 24 therein which progress outwardly from adjacent the center at an angle of forty-five degrees with respect to the pulley assembly radius. Similarly the inner guideway disk 21 has a series of logarithmic spiral guideways 25 radiating outwardly at an angle of forty-five degrees with respect to the pulley assembly radius, but in the opposite sense to the guideways 24 of guideway disk 19. Since the guideways 24 and 25 radiate outwardly at angles of forty-five degrees with respect to the pulley radius, but in opposite senses, the intersections of these guideways exist at ninety degrees at all radial positions. This results in a substantially constant geometry at the intersections of the logarithmic spiral guideways 24 and 25 at all radial positions for receiving the bearing region ends 29 of the belt engaging elements 18. Similarly, the inner guideway disk 22 has a series of logarithmic spiral guideways 26 radiating outwardly identically to the guideways 25 of inner guideway disk 21, and the outer guideway disk 23 includes logarithmic spiral guideways 27 extending outwardly identically to the guideways 24 of outer guideway disk 19. Hence, the guideways 26 and 27 intersect at ninety degrees at all radial positions to give a constant intersection geometry identical to the logarithmic spiral guideways 24 and 25 for receiving the other ends of the belt engaging elements 18.

While forty-five degree spirals have been shown and give ninety degree intersections, it will be understood that logarithmic spirals of other angularities may be used as desired Also, minor variations from a particular angularity may be tolerated so long as the belt engaging element bearing ends supported at the guideway intersections will move appropriately when the sheaves are rotated relative to each other to change the angular relationship between the inner and outer guideway disks.

The foregoing description of the basic configuration for the pulley assembly 11, the belt 13 and the belt engaging elements 18 is set forth in greater detail in the context of a continuously variable transmission in U.S. Pat. No. 4,295,836, dated Oct. 20, 1981, entitled "Flat Belt Transmission with Rotary Actuator and Integrated Control System" and issued to Emerson L. Kumm.

Figure 2:
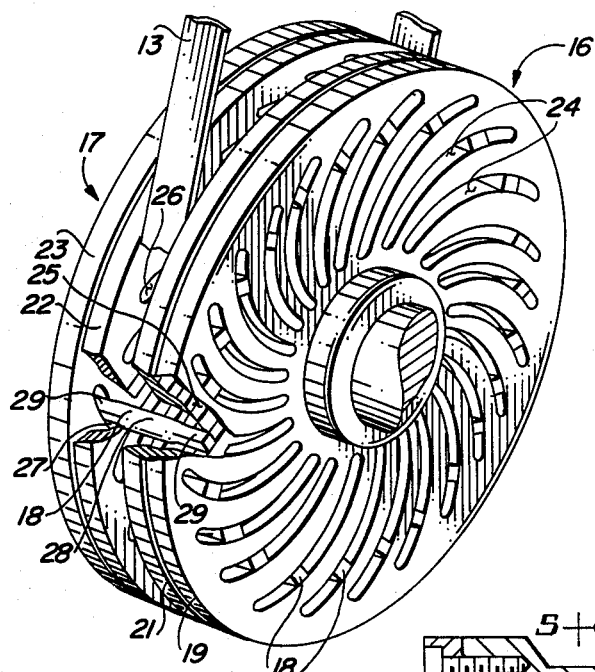
FIG. 2 is a partially cut-away perspective view of a variable diameter pulley assembly which is a key component of the subject system.
Figure 3:
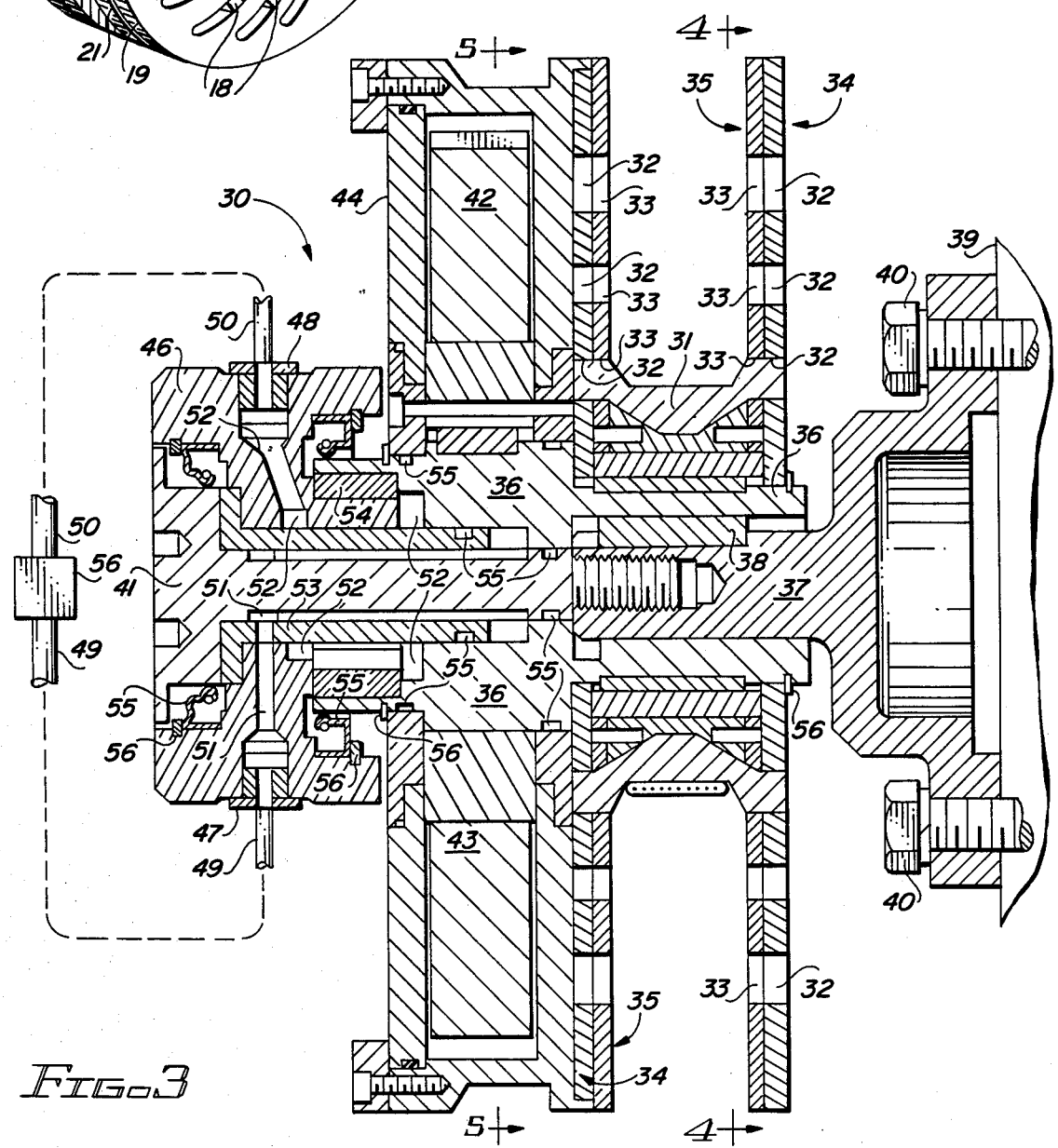
FIG. 3 is a cross section of a variable diameter pulley assembly incorporating control structure for effecting a change of effective diameter in accordance with its rotational speed.

Attention is now directed to FIG. 3 which is a detailed cross sectional view of a pulley assembly 30 which incorporates not only the components discussed in conjunction with FIG. 2, but also an integral control mechanism for establishing the radial position of belt engaging elements 31 to obtain the variable diameter operation. Thus, the belt engaging elements 31 are captured at their bearing ends within spiral guideways 32, 33, respectively, provided in outer guideway disk set 34 and inner guideway disk set 35. The outer guideway disk set 34 is fixed to a main shaft 36 for rotation therewith, and the main shaft 36 is, in turn, fixed to a mounting shaft 37 by a key 38. The mounting shaft 37 is directly connected to the rotating components of an engine and typically is fixed to the engine vibration damper 39 by bolts 40. Also rotating with the main shaft 36 and the mounting shaft 37 is a manifold axle bolt 41 which is axially aligned with and threaded into the end of the mounting shaft 37.

Shaft struts 42, 43, which are situated within an actuator housing 44, are also fixed to and rotate with the main shaft 36. It is well to note that the shaft struts 42, 43 are shown in FIG. 3 disposed at an oblique angle with respect to the vertical such that the resulting side view is difficult to interpret. However, subsequent reference to FIGS. 5, 6 and 7 will make the relationship of the shaft struts 42, 43 to one another and to other components of the control structure will become apparent.

The actuator housing 44, which is directly connected to the inner guideway disk set 35 in the circumferential region 45, ordinarily also rotates with the main shaft 36 and the mounting shaft 37, but transiently may shift its angular relationship therewith during operation to consequently cause the angular relationship between the outer guideway disk set 34 and the inner guideway disk set 35 to correspondingly change the radial positions of the belt engaging elements 31 in the manner generally discussed above with respect to FIG. 2.

Referring briefly to FIG. 4, it will again be appreciated that the mutual angular relationship between the outer guideway disk set 34 and the inner guideway disk set 35 establishes the intersection points of the logarithmic spirals and hence the radial positions at which the ends of the belt engaging elements 31 are captured to effect the instantaneous effective diameter of the pulley assembly.

Referring again to FIG. 3, a non-rotating manifold 46 includes fittings 47, 48 for coupling, respectively, a conduit 49 from a source of hydraulic fluid under pressure and a conduit 50 which provides a return path for the hydraulic fluid to the source which may simply be a conventional hydraulic pump 56. An inlet passage 51 extends, through various passage sections, axially inwardly and then radially outwardly through a passage section in the shaft strut 43 to the interior of the actuator housing 44. Similarly, exhaust passage 52 extends, through various passage sections, axially forwardly for discharge through the conduit 50. While the initial discharge section of the exhaust passage 52 is shown in FIG. 3 as being through the shaft strut 42, it will become evident below that each of the shaft struts 42, 43 include supply and discharge passage sections The manifold 46 is isolated from the rotating components by bearings 53, 54, and a number of seals 55 strategically situated at various points in the structure serve to isolate the various areas operating at different fluid pressures. Various retaining rings 56 serve to hold the assembly together in the conventional fashion as well as the seals 55 axially on the manifold 46.

Figure 7:
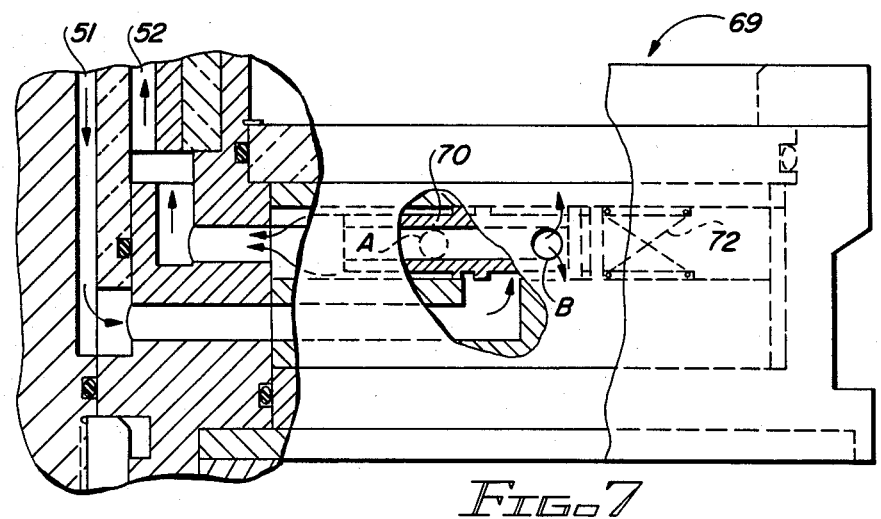
FIG. 7 is a view similar to FIG. 6 illustrating the valve in an alternative operative position.
Figure 5:
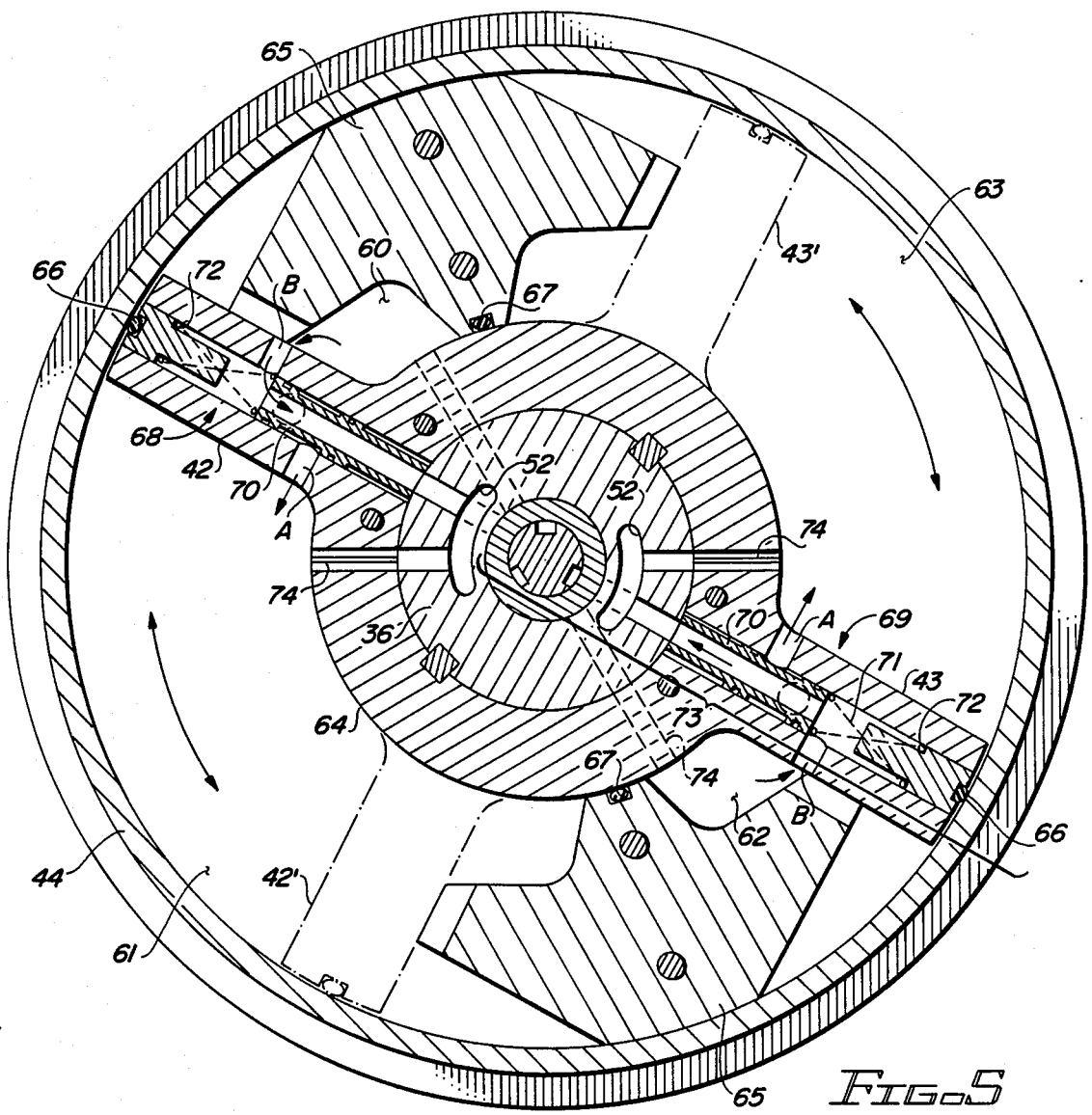
FIG. 5 is a cross sectional view taken along the lines 5—5 of FIG. 3.
Figure 6:
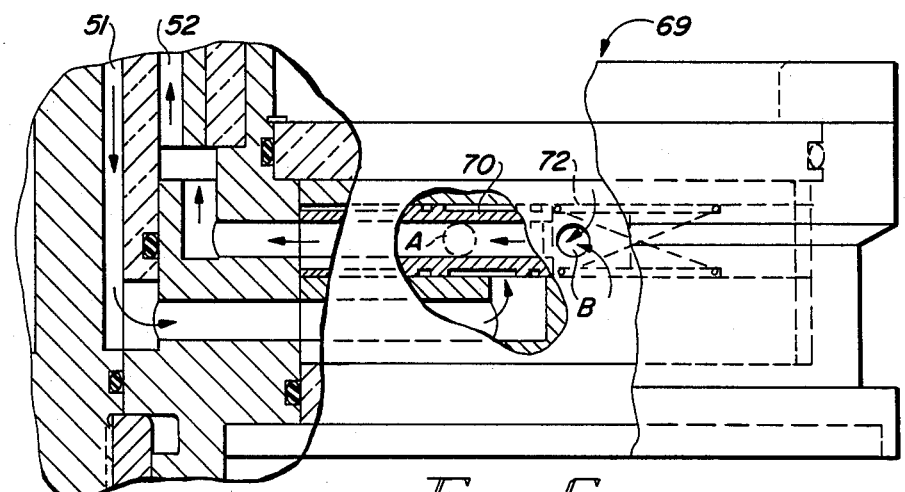
FIG. 6 is a partially broken away, partially cross sectional view of a strut component of the system illustrating the position of a valve situated therein.

Attention is now directed to FIGS. 5, 6 and 7 which illustrate the interior structure of a hydraulic actuator mechanism situated within the actuator housing 44. As previously mentioned, FIG. 5 is a cross sectional view taken along the lines 5—5 of FIG. 3. FIGS. 6 and 7 illustrate one of a matching pair of mirror image valves (shown in its alternative positions) situated in the shaft struts 42 and 43.

The interior of the actuator housing 44 is divided into four variable volume chambers 60, 61, 62, 63. The shaft struts 42, 43 join, at their radially inner ends, and are integral with, a shaft strut collar 64 which is keyed to the main shaft 36 as previously noted. Opposing actuator housing struts 65 are pinned to the actuator housing 44 and are thus rigid with respect to the actuator housing. Seals 66 placed at the radial outward extremities of the shaft struts 42, 43 bear against the inner circumferential surface of the actuator housing 44 to isolate, respectively, the chambers 60, 61 and the chambers 62, 63. Seals 67 placed at the radially innermost positions of the actuator housing struts 65 bear against the cylindrical portion of the outer surface of the shaft strut collar 64 and thus serve to isolate, respectively, the chambers 61, 62 and the chambers 63, 60. Therefore, it will be seen that the actuator system is really two-stages working in parallel in mirror image configurations such that much of the discussion to follow may be directed to half the structure, the other half functioning identically and supplementary to the first half.

Still referring to FIG. 5, it will be seen that mirror image spool valve subassemblies 68, 69 are situated, respectively, within the shaft struts 42, 43. Each valve subassembly 68, 69 includes a spool 70 capable of translating radially within a valve bore 71 against a compression spring 72. Those skilled in the valve art will appreciate that, until the centrifugal force applied to the compression spring by the weight of the spool 70 exceeds the bias of the compression springs 72, the spool 70 will be in a "low speed" position as shown in both FIGS. 5 and 6. However, when the rotational speed reaches a value at which the centrifugal force exerted by the spools 70 overcomes the bias of the compression springs 72, the spool 70 will move to its alternate "high speed" position shown in FIG. 7.

In the following discussion, it is important to appreciate that FIGS. 6 and 7 are taken generally from the viewpoint indicated by the arrowed line 73 in FIG. 5. Thus, it is the spool valve subassembly 69 that is shown in FIGS. 6 and 7, and it will be carefully noted that the view is 90° rotated from that shown in FIG. 5.

Consider first the configuration of the actuator mechanism when the rotational speed is below the speed at which the spool 70 changes position. Hydraulic fluid under pressure enters through the inlet passage section 51 and is directed, by the spool 70 to port A into the chamber 63. As a result, the shaft strut 43 (and, of course, the shaft strut 42) will have moved into the position shown in solid in FIG. 5 at which the shaft struts 42, 43 abut stop edges of the actuator strut 65. Capillary tubes 74 permit a slight continual circulation of the hydraulic fluid into the exhaust passage section 52, and the structure is stable with this configuration at all speeds below that in which the spool 70 shifts position. During the translation process, port B admits hydraulic fluid from the chambers 60, 62 into the valve bore 71 from which it can pass axially through the hollow interior of the spool valve 70 and into the exhaust passage 52. Thus, FIG. 6 illustrates the "large diameter" configuration for the pulley assembly which would run the engine accessories at a higher rate with respect to engine speed than the alternative position.

Consider now the operation when the rotational speed of the actuator housing 44 has reached a sufficient rate that the centrifugal force exerted on the spool 70 (in consequence of its weight and the characteristics of the spring) compresses the compression spring 72, thereby permitting the spool to move to its alternative, radially outermost position as shown in FIG. 7. In this position, the high pressure hydraulic fluid entering through the intake passage section 51 is diverted to flow out the port B while port A is placed into communication with the exhaust passage section 52. Consequently, the shaft struts 42, 43 move angularly, with respect to the actuator struts 65, counterclockwise to the position indicated in phantom and identified as 42', 43' such that the chambers 60, 62 will have expanded to their limit, and the chambers 61, 63 will have been reduced to their minimum. I.e., for this condition, the principal hydraulic fluid flow is outwardly through port B and inwardly through port A during the transition period, a modest amount of bleed action being thereafter maintained through capillary tubes 74.

Figure 4:
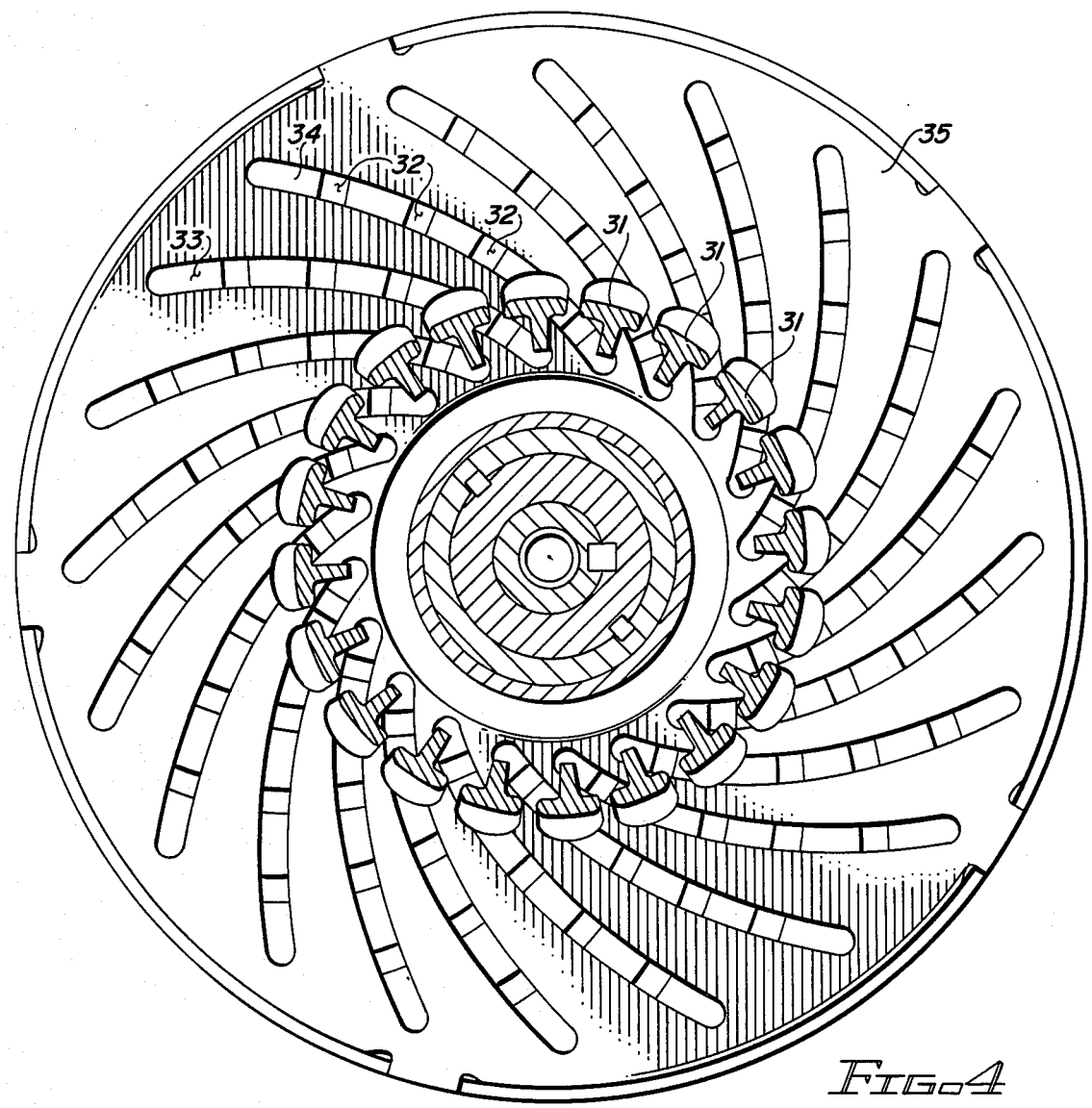
FIG. 4 is a cross sectional view taken along the lines 4—4 of FIG. 3.

It will be recalled that the shaft struts 42, 43 are fixed to and rotate with the main shaft 36 whereas the actuator housing 44 is coupled to the inner guideway disk set, all as shown in FIG. 3. Consequently, the inner and outer guideway disk sets will have transiently rotated with respect to each other to change their angular relationships in such a manner that the belt engaging elements 31 will have moved to their radially innermost position as shown in FIG. 4 to reduce the effective diameter of the pulley assembly which therefore drives the various engine accessories at a lower speed to achieve the benefits previously discussed.

As previously mentioned, the foregoing discussion has been directed to a system in which it is the driving pulley which is rendered speed responsive variable diameter. However, as also previously mentioned, it is within the purview of the invention to provide variable diameter capability to one or more of the driven pulleys in conjunction with a fixed or variable diameter driving pulley. It is only necessary to effect a minor change in the centrifugally actuated valve structure to reverse the effect obtained when the spool valve changes position in order that the driven pulley assembly assumes an effectively larger diameter in the higher speed range of the accessory input. Another method for obtaining the same effect is to merely exchange the positions of the hydraulic fluid supply and exhaust conduits 49, 50.

In addition, although the invention has been described in the exemplary environment of an engine driving rotating accessories, those skilled in the art will appreciate that the prime mover need not necessarily be an engine, and other prime mover environments, such as electric motors, are contemplated.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

I claim:

1. A drive system for prime-mover-driven accessories comprising:
   (A) a prime mover having a rotating output;
   (B) a flat belt pulley affixed to a rotating component of each accessory to be driven by said prime mover, said accessories being arranged such that said accessory flat belt pulleys are disposed to be driven in tandem by a flat belt;
   (C) a pulley assembly connected to said prime mover rotating output, said pulley assembly including:
     1. a shaft;
     2. a pair of pulley sheaves;
     3. a series of belt engaging elements, each said belt engaging element having:
        a. an elongated central shank including a drive surface adapted to be engaged by said drive belt;

b. a first bearing region at a first end of said central shank; and
c. a second bearing region at a second end of said central shank;
4. each said pulley sheave including:
   a. a pair of relatively movable guideway disks lying alongside each other in juxtaposition;
      i. an inner guideway disk of each said pair including a first series of guideways extending in one direction;
      ii. an outer guideway disk of each said pair including a second series of guideways extending in a second direction;
      iii. said first and second series of spiral guideways providing intersections for capturing and locating said bearing regions of said belt engaging elements, said intersections providing locations for said bearing regions to establish radial positions of said belt engaging elements with respect to said shaft;
5. means connecting said inner guideway disks of said pulley sheaves together to establish an inner guideway disk set which rotates about the axis of said shaft;
6. means connecting said outer guideway disks of said pulley sheaves together to establish an outer guideway disk set which rotates about the axis of said shaft;
7. means connecting one of said guideway disk sets to said shaft for rotation therewith;
8. means drivingly coupling said prime mover output to said shaft; and
9. control means responsive to prime mover speed for adjusting the angular relationship between said inner guideway disk set and said outer guideway disk set to establish the effective diameter of said pulley assembly;
(D) an idler flat belt pulley disposed to be driven in tandem by a flat belt with said accessory flat belt pulleys, said idler flat belt pulley being adapted to adjust its position with respect to said pulley assembly in order to maintain belt tension within an acceptable range when the effective diameter of said pulley assembly changes; and
(E) a flat drive belt drivingly coupling said pulley assembly and said accessory and idler flat belt pulleys.

2. The drive system of claim 1 in which control means adjusts the angular relationship between said inner guideway disk set and said outer guideway disk set to establish the effective diameter of said pulley assembly at a first value when said prime mover speed is within a first speed range and to establish the effective diameter of said pulley assembly at a second value which is smaller than said first value when said prime mover speed is within a second speed range which is higher than said first speed range.

3. The drive system of claim 1 in which said control means comprises:
(A) a source of hydraulic fluid under pressure;
(B) a hydraulic coupling operatively disposed between said shaft and the one of said inner and outer guideway disks sets which is not connected to said shaft;
(C) a speed responsive hydraulic valve operatively disposed between said source of hydraulic fluid and said hydraulic coupling, said speed responsive valve operating to change position when said prime mover speed changes between said first and second speed ranges, said hydraulic coupling responding to a change in position of said hydraulic valve by adjusting the angular relationship between said inner guideway disk set and said outer guideway disk set.

4. A drive system for prime-mover-driven accessories comprising:
(A) a prime mover having a rotating output;
(B) a flat belt pulley affixed to said prime mover rotating output and to each of said accessories to be driven by said prime mover, said accessories being arranged such that said accessory flat belt pulleys are disposed to be driven in tandem by a flat belt;
(C) at least one of said flat belt pulleys affixed to said accessories comprising a pulley assembly connected to an accessory input, said pulley assembly including:
(1) a shaft;
(2) pair of pulley sheaves;
(3) a series of belt engaging elements, each said belt engaging element having:
  (a) an elongated central shank including a drive surface adapted to be engaged by said drive belt;
  (b) a first bearing region at a first end of said central shank; and
  (c) a second bearing region at a second end of said central shank;
(4) each said pulley sheave including:
  (a) a pair of relatively movable guideway disks lying alongside each other in juxtaposition;
    (i) an inner guideway disk of each said pair including a first series of guideways extending in one direction;
    (ii) an outer guideway disk of each said pair including a second series of guideways extending in a second direction;
    (iii) said first and second series of spiral guideways providing intersections for capturing and locating said bearing regions of said belt engaging elements, said intersections providing locations for said bearing regions to establish radial positions of said belt engaging elements with respect to said shaft;
(5) means connecting said inner guideway disks of said pulley sheaves together to establish an inner guideway disk set which rotates about the axis of said shaft;
(6) means connecting said outer guideway disks of said pulley sheaves together to establish an outer guideway disk set which rotates about the axis of said shaft;
(7) means connecting one of said guideway disk sets to said shaft for rotation therewith;
(8) means drivingly coupling said accessory input to said shaft; and
(9) control means responsive to said accessory input speed for adjusting the angular relationship between said inner guideway disk set and said outer guideway disk set to establish the effective diameter of said pulley assembly;
(D) an idler flat belt pulley disposed to be driven in tandem by a flat belt with said accessory flat belt pulleys, said idler flat belt pulley being adapted to adjust its position with respect to said pulley assembly in order to maintain belt tension within an acceptable range when the effective diameter of said pulley assembly changes; and (E) a flat drive belt drivingly coupling said pulley assembly and said prime mover, accessory and idler flat belt pulleys.

5. The drive system of claim 4 in which control means adjusts the angular relationship between said inner guideway disk set and said outer guideway disk set to establish the effective diameter of said pulley assembly at a first value when said accessory input speed is within a first speed range and to establish the effective diameter of said pulley assembly at a second value which is larger than said first value when said accessory input speed is within a second speed range which is higher than said first speed range.

6. The drive system of claim 5 in which said control means comprises:

(A) a source of hydraulic fluid under pressure;

(B) a hydraulic coupling operatively disposed between said shaft and the one of said inner and outer guideway disks sets which is not connected to said shaft;

(C) a speed responsive hydraulic valve operatively disposed between said source of hydraulic fluid and said hydraulic coupling, said speed responsive valve operating to change position when said accessory input speed changes between said first and second speed ranges, said hydraulic coupling responding to a change in position of said hydraulic valve by adjusting the angular relationship between said inner guideway disk set and said outer guideway disk set.

* * * * *